Aug. 17, 1937.          C. L. TOMLINSON          2,090,243
                              PLOW
                    Filed June 8, 1936          2 Sheets-Sheet 1
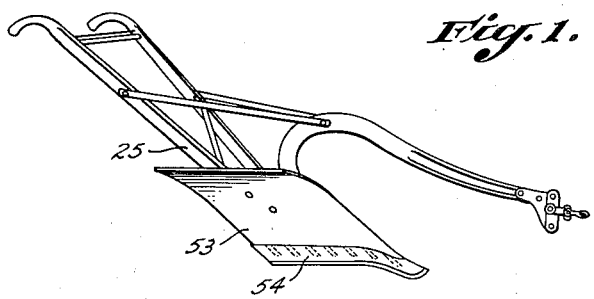
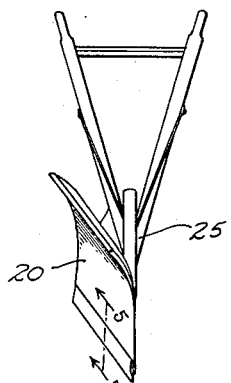
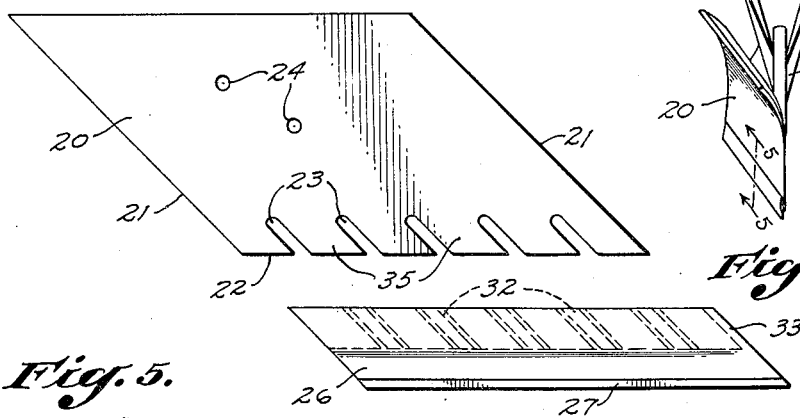
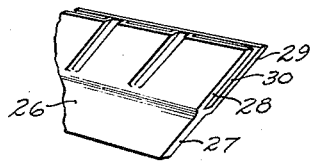
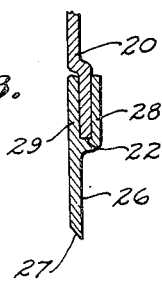
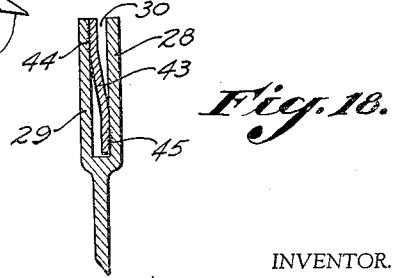
INVENTOR.
Clarence L. Tomlinson,
BY Russell M. Otis
ATTORNEY.

Aug. 17, 1937.                    C. L. TOMLINSON                    2,090,243
                                      PLOW
                               Filed June 8, 1936                 2 Sheets-Sheet 2
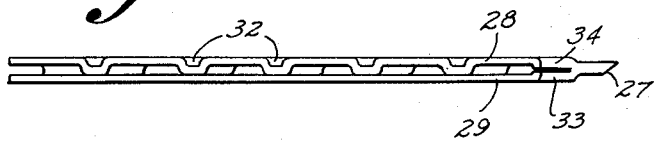
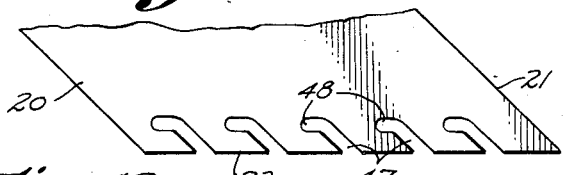
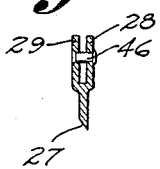
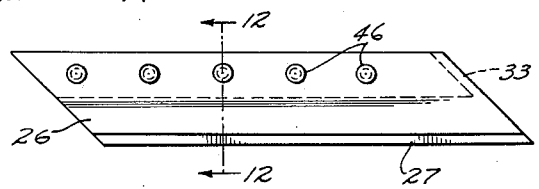
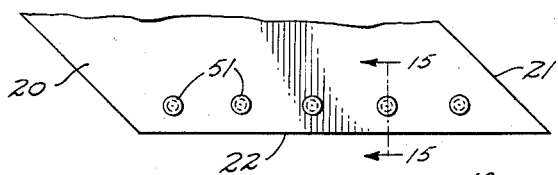
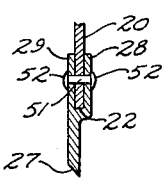
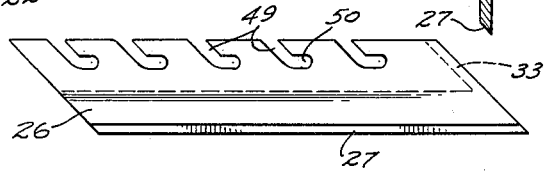
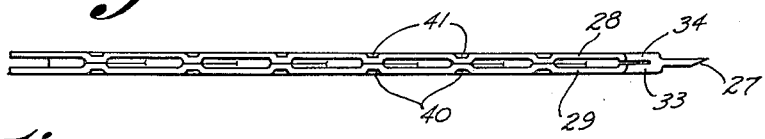
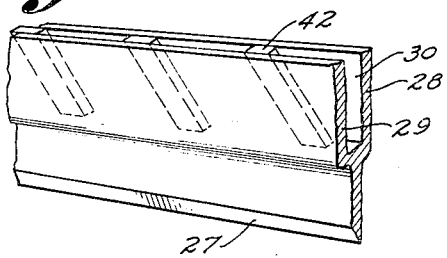
INVENTOR.
Clarence L. Tomlinson,
BY  Russell M. Otis
                        ATTORNEY.

Patented Aug. 17, 1937

2,090,243

UNITED STATES PATENT OFFICE 2,090,243

PLOW

Clarence L. Tomlinson, Los Angeles, Calif.

Application June 8, 1936, Serial No. 84,169

16 Claims. (Cl. 97—125)

My invention relates to plows and like implements and particularly to one comprising a conveniently removable cutting edge member and having provision for retaining said member on its companion plow body.

An object of my invention is to provide a simple and efficient plow which can be made very cheaply.

Another object of the invention is to provide a plow having a conveniently removable cutting edge member and means for retaining said member on its companion plow body.

Another object of the invention is to provide a plow having a removable cutting edge member which terminates in a bifurcated portion where it joins with the companion plow body.

Still another object is to provide a plow of this character in which the removable cutting edge member is retained on its companion plow body by means on both parts which cooperate to restrict separation of the branch components of said removable part as well as to retain it on its companion member.

These and other apparent objects I attain in a manner which will be clear from a consideration of the following description taken in connection with the accompanying drawings, of which, Fig. 1 is a view in perspective of the side of one form of my plow.

Fig. 2 is a plan view of another form of my plow.

Fig. 3 is a view of the body of the plow shown in Fig. 2 in one stage of its manufacture.

Fig. 4 is a view of one form of the removable cutting edge member of my plow.

Fig. 5 is a sectional view of the form of plow shown in Fig. 2, taken along the line 5—5 between slots in the body.

Fig. 6 is a view of the removable cutting edge member shown in Fig. 4 in one stage of its manufacture.

Fig. 7 is a partial view in perspective of the removable cutting edge member shown in Fig. 4, as taken from the rear and under side.

Fig. 8 is a sectional view of a modified form of my plow corresponding to Fig. 5.

Fig. 9 is a plan view of the removable cutting edge of Fig. 4 viewed from the point of view of the entering companion plow body.

Fig. 10 is a partial side view of an alternative form of plow body.

Fig. 11 is a side view of a removable cutting edge member which is a companion to the plow body shown in Fig. 10.

Fig. 12 is a cross-sectional view of the member shown in Fig. 11 taken along the line 12—12.

Fig. 13 is a partial side view of an alternative form of plow body.

Fig. 14 is a side view of a removable cutting edge member which is a companion to the plow body shown in Fig. 13.

Fig. 15 is a partial sectional view of the plow composed of the members shown in Figs. 13 and 14 taken along the line 15—15 of Fig. 13.

Fig. 16 is a plan view of an alternative form of the member shown in Fig. 4.

Fig. 17 is a partial view in perspective of an alternative form of the member shown in Fig. 4.

Fig. 18 is a sectional view of an alternative form of the member shown in Fig. 4 taken along the line of one of the keys connecting the branch components of the member.

Plows are now ordinarily made with an upper or moldboard portion attached to a chassis arranged to be propelled by one means or another. To the moldboard is ordinarily attached by bolts a plowshare of considerable width. These plowshares are very expensive because of the necessity of using in them a metal of long wearing qualities and because of their size and peculiar shape. Ordinarily it is the point and cutting edge of the plowshare which is worn away, and when this occurs the user is required to remove it from the plow and take it, at considerable delay and expense, to be sharpened. To avoid this delay and expense, removable cutting edges are sometimes employed which fit on over the cutting edge of the ordinary plowshare and take the wear in place of the share. These removable cutting edges are commonly held on the plowshare by friction and are designed to be employed with a plowshare of standard construction.

By the present invention I secure the advantages of a removable cutting edge member which can sell for so low a price that it can economically be thrown away rather than sharpen it, and at the same time secure additional advantages over any now known arrangement—such as lower original cost of the entire plow assembly, a longer wearing cutting edge, and one that stays on the plow better in hard and rough ground.

I secure these results, preferably, by making my plow in two pieces, both especially designed to mate with each other, one of which corresponds in extent generally to the greater part of the present moldboard and plowshare and referred to herein as the plow body or body member; and the other piece of which constitutes a removable cutting edge member. The body member of my plow is preferably, though not necessarily, made by cutting a parallelogram 20 out of a sheet of metal, the edges 21 being at an angle of approximately 45° to the forward edge 22. The forward edge 22 is preferably slotted at intervals along its length to form a plurality of slots 23 of substantial width extending transversely from edge 22. The body 20 is then rolled along an axis parallel to edge 22 into the form shown in Fig. 2. Holes 24 are provided for reception of bolts which hold the body of the plow to the chassis 25.

The removable cutting edge member, shown in one form in Fig. 4, consists of a bifurcated longitudinally extending strip 26 formed on one edge with the beveled cutting edge 27 and at the other terminating in the branch components 28 and 29. The branches 28 and 29 over most of their length lie parallel to one another and form a channel 30 for the reception of the slotted edge 22 of the body member 20. This channel 30 is interrupted at intervals along its length by keys which are adapted to fit into the slots 23 in the body member. The keys in channel 30 may be formed in a variety of ways. In Figs. 4, 6, 7, and 9 is illustrated one form of key and a method of its formation in the removable cutting edge member. The member starts as a T-shaped blank having rolled on one element the beveled cutting edge 27. In the next operation there are formed on the long element 31 of the T a series of channel-shaped indentations 32 each of which extends from the edge of the element 31 to near its middle and at an angle to the edge equal to the angle made by slots 23 with the edge 22. The front edges of the element 31 are also turned up to form lips 33 and 34. The two halves of the element 31 are then folded up around the center line of the element and into the position shown in Figs. 7 and 9, in which the backs of the indentations 32 come up against the face of branch 29 and the lips 33 and 34 nearly meet at the front of the implement. The metal of the indented portions 32 may then be connected as by rivets or by welding, preferably by an electrical spot welding method to the contacting metal of branch 29. The depth and width of the channel-shaped indentations 32 and other dimensions are so proportioned that when the member is finished it slips tightly over the slotted edge 22 of the body member, the spaces 35 between the slots 23 passing into the channel 30 and the metal of the indentations 32 acting as tight fitting keys which slide into the slots 23. The lips 33 and 34 provide an expansible nose and an abutment for the front edge 21 of the body member.

Since in use, the force on the plow is against the cutting edge 27 and toward the rear of the plow, it is seen that the cutting edge member is forced onto the body member while in use and has no tendency to slip off. The front face of the cutting edge member is smooth and the channelled side of the keys is toward the back of the plow where contact with the earth is less frequent. It will be noted that by cooperation of the keys in the cutting edge member and the slots in the body member, the cutting edge member is not only retained on the body member, but the branch components 28 and 29 of the bifurcated cutting edge member are prevented from being spread apart from one another by the lodging of dirt, sand, roots, etc., therebetween.

The method of forming a bifurcated strip from a blank of T section, as here explained, is described in my copending application, Serial No. 70,413, filed March 23, 1936, in connection with the manufacture of a removable cutting edge of different specific design; but the cutting edge member described as a part of the present invention may alternatively be formed by welding two or more properly shaped pieces together at the longitudinal edge of one of them or in any other suitable manner, as will be clear to one skilled in the art. In the use of the word "bifurcated", I do not intend to connote that the branch components between which the edge of the body member is received are of one piece of metal; I refer simply to the shape of the cutting edge member and not to its method of manufacture. In the use of the word "bifurcated" I intend to include also any structure which has divided branches in which one branch is punched out of the other, or in which the branches are formed by alternately bending adjacent portions in opposite directions or are formed in any other suitable manner so long as there are spaced branches adapted to lie on opposite sides of a body member.

A modified form of body member is shown in Fig. 8 in which the body member is offset to the rear by the amount of the thickness of metal in the branch 29 of the cutting edge member, and to a height equal to or less than the depth of channel 30, and the branch 29 is made a continuation of the strip 26. The result is a plow that is smooth over the entire face.

An alternative construction providing keys in the removable cutting edge member is that shown in Fig. 16 in which a series of channel-shaped indentations 40 are formed in branch component 29 and opposing indentations 41 are formed in branch 28 of the removable cutting edge member. The indentations are formed of such a depth that when the two branch components 28 and 29 are forced together to form a channel of proper width to receive the slotted end of body 20, the backs of the indented portions 40 and 41 form a series of keys which fit into the slots 23 on the body member. The backs of the indented portions 40 and 41 may be connected together by riveting or by spot welding or otherwise to restrict the relative separation of the branch components of the cutting edge member.

Another alternative construction of the removable cutting edge member is shown in Fig. 17. In this construction the two branches 28 and 29 are both flat and extend substantially parallel with one another to form the channel 30 for the reception of the slotted edge of body 20. Into this channel are placed at intervals a series of keys in the form of blocks 42 of metal which are spot welded to or riveted to one or both of the branches 28 and 29. The keys 42 are so placed and dimensioned as to register with the slots 23 in the body 20 when the body 20 is seated within the channel 30.

An alternative form of this type of key is shown in Fig. 18 in which a series of keys is welded to the branch components 28 and 29 to register with the slots 23 on the body member but in which each key consists of a strip 43 of metal of less thickness than the width of the channel 30 and of a width along the edge adapted to fit into one of the slots 23 and which is welded to one of the branch components at the top, as to branch 29 at 44 near the entrance to channel 30, and to the other branch 28 at a point 45 farther from the entrance to the channel 30. This construction keeps the two branches 28 and 29 from spreading far apart from one another while at the same time permitting some relative movement by deflection of the strip 43.

Another alternative construction of the removable cutting edge is as shown in Figs. 11 and 12. Here keys adapted to fit slots in the body member are provided in the form of pins 46 passing through the branches 28 and 29 of the removable cutting edge member. The pins may be flat-headed on one side and seat in a countersunk hole in branch component 29 and be riveted over on the outside of branch component 28. To mate with a removable cutting edge member of this construction, a special style of slot may be provided in the body member as shown in Fig. 10. The slots 47 in the body 20 pass rearwardly from and at an angle to the edge 22 and then parallel to the edge 22 at 48. In the combination represented by Figs. 10 and 11, the pins 46 are so placed in the removable cutting edge member that they slide into the slots 47 and back into the horizontal portions 48 of those slots and repose at the ends thereof when the body member is seated within the channel 30.

An alternative combination is that shown in Figs. 13, 14 and 15, in which slots are provided in the removable cutting edge member and pins registering therewith are provided on the mating body member. The slots 49 are formed in both the branches 28 and 29 of the removable cutting edge member and extend downwardly and forwardly therein, terminating in horizontal portions 50 which project forwardly. In the body 20 are press-fitted a series of pins 51 which project beyond the face of the body 20 on both sides thereof and end on each side in a button 52 of greater diameter than the width of slots 49. In fitting the removable cutting edge member on the body of the plow the pins 51 slip into the slots 49 and the edge 22 slips into the channel between the branches 28 and 29. The edge member is then forced upwardly and backwardly until the pins 51 repose at the ends of horizontal slots 50 and the edge 21 of body 20 comes against the abutment formed by lips 33 and 34. It will be noted that this form of the invention not only retains the cutting edge member on the plow body but also restricts relative separation of the branch components of the cutting edge member.

It will be obvious that the principles of design underlying the forms of this invention may be applied as well to a plow in which the body member is not made from a single sheet of metal having a straight forward edge, but is cast or forged in the shape of the ordinary plow with a landside portion and an irregularly shaped front edge as shown in Fig. 1. The only difference in the removable cutting edge members 54 required to make them fit such a plow body 53 designed to mate with them is that the cutting edge members must be bent to configurate with the irregular shape of that type of plow body, the keys or slots in the removable cutting edge member being placed parallel to one another and adapted to register with the corresponding slots or pins on the plow body.

I have illustrated my invention by showing a plow body made of one piece of metal because my invention permits a one piece body to be employed and it is cheaper than any other construction. But, of course, the same type of cooperation between my removable cutting edge members and the plow body is possible if the plow body is made in more than one piece.

Instead of employing a plurality of slots in the plow body and a plurality of mating keys in the removable cutting edge member, I may employ a single slot and a single key after the manner of those described herein.

It will be understood that other changes and modifications in design and construction may be made by those skilled in the art, and the invention may be applied to earth-working implements of like character to that of plows, and I wish, therefore, to be limited only by the appended claims.

I claim:

1. An earth-working implement comprising a body member having a slot extending transversely from its forward edge, and a bifurcated member provided with a cutting edge and having spaced branch components providing a channel therebetween to receive the forward edge of said body member, and a key portion located in said channel connecting said spaced branch components and adapted to register with and engage a wall of said slot in the body member.

2. An earth-working implement comprising a body member having a plurality of slots extending transversely from its forward edge, and a bifurcated member provided with a cutting edge and having spaced branch components adapted to receive the forward edge of said body member therebetween, and a plurality of keys located between said branch components and adapted to register with and engage walls of said slots in the body member.

3. An earth-working implement comprising a body member having a plurality of slots extending transversely from its forward edge, and a bifurcated member provided with a cutting edge and having spaced branch components providing a channel therebetween to receive the forward edge of said body member, and a plurality of keys located in said channel connecting said branch components and adapted to register with and engage walls of said slots in the body member.

4. A plow comprising a concave sheet of metal of substantially the same thickness throughout, and a bifurcated member provided with a cutting edge and having spaced branch components providing a channel therebetween to receive the forward edge of said metal sheet, and means on said metal sheet and on said bifurcated member to retain said member on said metal sheet and to restrict relative separation of said spaced branches.

5. A plow comprising a body member having a slot extending transversely from its forward edge, and a removable cutting edge member provided with a cutting edge and having components spaced to receive the forward edge of said body member therebetween, one of said components having a key connected thereto adapted to fit into and engage a wall of said slot of the body member.

6. A plow comprising a body member having a plurality of slots extending transversely from its forward edge, and a bifurcated member provided with a cutting edge and having spaced branch components providing a channel therebetween to receive the forward edge of said body member, one of said branch components having a plurality of indentations forming keys in said channel adapted to register with the slots in said body member.

7. A plow comprising a body member having a plurality of slots extending transversely from its forward edge, and a bifurcated member provided with a cutting edge and having spaced branch components providing a channel therebetween to receive the forward edge of said body member, one of said branch components having a plurality of indentations forming keys in said channel adapted to register with the slots in said body member, and the indented portions being attached to the opposing portions of the other branch component.

8. A plow comprising a body member having a plurality of slots extending transversely from its forward edge, and a bifurcated member provided with a cutting edge and having spaced branch components providing a channel therebetween to receive the forward edge of said body member, both of said branch components being indented at corresponding intervals along their lengths, whereby the opposing indented portions form a series of keys in said channel adapted to register with the slots in said body member.

9. A plow comprising a body member having a plurality of slots extending transversely from its forward edge, and a bifurcated member provided with a cutting edge and having spaced branch components providing a channel therebetween to receive the forward edge of said body member, both of said branch components being indented at corresponding intervals along their lengths, and the opposing indented portions being connected to form a series of keys in said channel adapted to register with the slots in said body member.

10. A plow comprising a body member having a slot extending transversely from its forward edge, and a removable cutting edge member provided with a cutting edge and having components spaced to receive the forward edge of said body member therebetween, one of said components having a channel-shaped indentation therein extending into the space between said components and adapted to register with said slot in the body member.

11. A plow comprising a body member having a slot extending transversely from its forward edge, and a bifurcated member provided with a cutting edge and having spaced branch components providing a channel therebetween to receive the forward edge of said body member, and a key located in said channel and attached to one of said branch components, said key being adapted to register with and engage a wall of the slot in said body member.

12. A plow comprising a body member having a plurality of slots extending transversely from its forward edge, and a bifurcated member provided with a cutting edge and having spaced branch components providing a channel therebetween to receive the forward edge of said body member, and a plurality of keys located in said channel and attached to both of said branch components, said keys being adapted to register with and engage walls of the slots in said body member.

13. A plow comprising a body member having a slot extending transversely from its forward edge, and a metal bifurcated member provided with a cutting edge and having spaced branch components providing a channel therebetween to receive the forward edge of said body member, and a metal strip of less thickness than the width of said channel located in said channel and having one side welded to one branch component at a point near the entrance to said channel and the other side welded to the other of said branch components at a point further from the entrance to the channel, said strip being located to register with the slot in said body member.

14. A plow comprising a body member having a slot extending transversely from its forward edge and terminating in a portion disposed substantially parallel to said forward edge, and a bifurcated member provided with a cutting edge and having spaced branch components providing a channel therebetween to receive the forward edge of said body member, and a pin connecting said branch components and adapted to repose in the terminating parallel portion of said slot in the body member when said body member is seated within said channel.

15. A removable cutting edge member for use with a companion plow body comprising an elongated strip provided with a cutting edge, the opposite edge of said strip terminating in spaced branch components providing a channel therebetween for reception of said plow body, and a plurality of keys located in said channel and connecting said branch components.

16. An earth-working implement comprising a body member and a removable cutting edge member having components spaced laterally to receive the forward edge of said body member therebetween, means forming a part of said cutting edge member to restrict relative separation of said spaced components, and means on said body member cooperating with said first-mentioned means to retain said cutting edge member on said body member.

CLARENCE L. TOMLINSON.